United States Patent
Kato et al.

(10) Patent No.: US 10,351,015 B2
(45) Date of Patent: Jul. 16, 2019

(54) HYBRID VEHICLE

(71) Applicant: TOYOTA JIDOSHA KABUSHIKI KAISHA, Toyota-shi, Aichi-ken (JP)

(72) Inventors: Shunya Kato, Seto (JP); Masaya Sugai, Toyoake (JP)

(73) Assignee: Toyota Jidosha Kabushiki Kaisha, Toyota-shi, Aichi-ken (JP)

(*) Notice: Subject to any disclaimer, the term of this patent is extended or adjusted under 35 U.S.C. 154(b) by 0 days.

(21) Appl. No.: 15/876,524

(22) Filed: Jan. 22, 2018

(65) Prior Publication Data

US 2018/0208077 A1   Jul. 26, 2018

(30) Foreign Application Priority Data

Jan. 23, 2017 (JP) ................. 2017-009172

(51) Int. Cl.
*B60W 30/14* (2006.01)
*B60L 15/20* (2006.01)
(Continued)

(52) U.S. Cl.
CPC .......... *B60L 15/2009* (2013.01); *B60K 6/442* (2013.01); *B60K 6/445* (2013.01); *B60K 6/547* (2013.01); *B60L 7/16* (2013.01); *B60L 7/24* (2013.01); *B60L 50/16* (2019.02); *B60W 10/08* (2013.01); *B60W 10/115* (2013.01); *B60W 10/184* (2013.01); *B60W 20/30* (2013.01); *B60W 30/143* (2013.01); *B60W 30/18127* (2013.01); *B60W 30/18136* (2013.01); *F16H 61/08* (2013.01); *F16H 61/686* (2013.01); *F16H 63/50* (2013.01); *B60W 2030/18081* (2013.01); *B60W 2510/0657* (2013.01); *B60W 2510/083* (2013.01); *B60W 2510/105* (2013.01); *B60W 2710/083* (2013.01); *F16H 3/728* (2013.01);
(Continued)

(58) Field of Classification Search
None
See application file for complete search history.

(56) References Cited

U.S. PATENT DOCUMENTS

2008/0236912 A1   10/2008   Ueoka et al.
2010/0151988 A1    6/2010   Tabata et al.
(Continued)

FOREIGN PATENT DOCUMENTS

JP   2005-061299 A   3/2005
JP   2007-1392       1/2007
(Continued)

*Primary Examiner* — Justin Holmes
(74) *Attorney, Agent, or Firm* — Finnegan, Henderson, Farabow, Garrett & Dunner, LLP (57) ABSTRACT

A hybrid vehicle includes an engine, a first rotating electric machine, a second rotating electric machine coupled to drive wheels of the hybrid vehicle, a planetary gear mechanism configured to mechanically couple the engine, the first rotating electric machine, and the second rotating electric machine, an electric power storage device configured to perform charging and discharging with the first rotating electric machine and second rotating electric machine, and an electronic control unit configured to, in a case where cruise control is requested or in a case where deceleration torque is requested by the cruise control, execute motoring control and simulated stepped gear shift control.

4 Claims, 8 Drawing Sheets

(51) Int. Cl.

| | | |
|---|---|---|
| *B60K 6/547* | (2007.10) |
| *B60L 7/16* | (2006.01) |
| *B60L 7/24* | (2006.01) |
| *B60W 10/08* | (2006.01) |
| *B60W 10/115* | (2012.01) |
| *B60W 20/30* | (2016.01) |
| *B60W 10/184* | (2012.01) |
| *F16H 61/08* | (2006.01) |
| *F16H 61/686* | (2006.01) |
| *F16H 63/50* | (2006.01) |
| *B60K 6/442* | (2007.10) |
| *B60K 6/445* | (2007.10) |
| *B60W 30/18* | (2012.01) |
| *B60L 50/16* | (2019.01) |
| *F16H 59/42* | (2006.01) |
| *F16H 61/16* | (2006.01) |
| *F16H 3/72* | (2006.01) |
| *F16H 61/66* | (2006.01) |
| *F16H 59/18* | (2006.01) |
| *F16H 59/44* | (2006.01) |
| *F16H 59/68* | (2006.01) |
| *F16H 59/36* | (2006.01) |

(52) U.S. Cl.
CPC ............. *F16H 59/18* (2013.01); *F16H 59/42* (2013.01); *F16H 59/44* (2013.01); *F16H 59/68* (2013.01); *F16H 61/16* (2013.01); *F16H 2059/366* (2013.01); *F16H 2061/6603* (2013.01); *F16H 2061/6615* (2013.01); *Y02T 10/6234* (2013.01); *Y02T 10/6239* (2013.01); *Y02T 10/6286* (2013.01); *Y02T 10/7077* (2013.01); *Y02T 10/7275* (2013.01)

(56) References Cited

U.S. PATENT DOCUMENTS

| | | | |
|---|---|---|---|
| 2014/0005868 A1* | 1/2014 | Wang | B60W 20/30 701/22 |
| 2015/0151627 A1* | 6/2015 | Kato | B60W 20/10 475/5 |
| 2016/0129903 A1 | 5/2016 | Takahashi | |

FOREIGN PATENT DOCUMENTS

| | | |
|---|---|---|
| JP | 2008-247073 A | 10/2008 |
| JP | 2010-100256 A | 5/2010 |
| JP | 2010-173493 | 8/2010 |
| JP | 2016-088380 A | 5/2016 |

* cited by examiner

⟨SELF-SUSTAINING OPERATION⟩

FIG. 3B

⟨MOTORING⟩

HYBRID VEHICLE

INCORPORATION BY REFERENCE

The disclosure of Japanese Patent Application No. 2017-009172 filed on Jan. 23, 2017 including the specification, drawings and abstract is incorporated herein by reference in its entirety.

BACKGROUND

1. Technical Field

The present disclosure relates to a hybrid vehicle, and more specifically, to control of a hybrid vehicle that travels while executing cruise control that is control for maintaining a vehicle speed at a target value.

2. Description of Related Art

A hybrid vehicle including an engine, first and second rotating electric machines, a planetary gear mechanism, and a battery is known (for example, see Japanese Unexamined Patent Application Publication No. 2007-001392 (JP 2007-001392 A)). The second rotating electric machine is coupled to drive wheels of the hybrid vehicle. The planetary gear mechanism mechanically couples the engine, the first rotating electric machine, and the second rotating electric machine. The battery performs charging and discharging with the first rotating electric machine and second rotating electric machine.

SUMMARY

For example, at the time of braking of the hybrid vehicle disclosed in JP 2007-001392 A, regeneration control by the second rotating electric machine is executed, and regenerative electric power is charged in the battery. In general, "chargeable electric power" that is upper limit electric power chargeable in the battery is determined according to a temperature and a state of charge (SOC) of the battery. In order to appropriately protect the battery, there is demand for limiting the regenerative electric power to be equal to or less than the chargeable electric power.

Among hybrid vehicles, a hybrid vehicle that is configured to execute cruise control for maintaining a vehicle speed at a target value regardless of an accelerator operation amount is known. Hereinafter, in a hybrid vehicle that is traveling (cruise traveling) while executing cruise control, a situation is assumed in which a traveling state in which a vehicle speed is likely to increase is continued. As the situation described above, for example, a situation in which the hybrid vehicle is traveling on a relatively long downhill is exemplified.

In order to maintain the vehicle speed constant during traveling on the relatively long downhill, there is demand for continuously generating sufficient braking torque as a whole of the hybrid vehicle. As a method of realizing the above, regenerative torque can be continuously generated by a second rotating electric machine. However, in this case, since regenerative electric power (power corresponding to regenerative torque) of the second rotating electric machine is continuously charged in a battery, an SOC of the battery may approach a full charge state. As a result, there is a possibility that chargeable electric power is limited to a value smaller than a threshold. When this happens, in the second rotating electric machine, it is not possible to secure sufficient braking torque.

Accordingly, in a case where the chargeable electric power is limited, it is considered that motoring of an engine is performed by a first rotating electric machine to increase a rotation speed of the engine. With this, engine brake torque according to the rotation speed of the engine is applied to drive wheels as braking torque (details will be described below). As a result, since it is possible to decrease regenerative torque by an amount of applied engine brake torque while securing the braking torque as the whole of the hybrid vehicle, it is possible to further reduce charging electric power to the battery.

There is a case where the chargeable electric power needs to be quickly decreased according to the situation of the battery. In a case of performing motoring while quickly decreasing the chargeable electric power, there is demand for rapidly increasing the rotation speed of the engine, and accordingly, for rapidly increasing the engine brake torque. However, when this happens, the rotation speed of the engine increases even during traveling on a relatively long downhill, and there is a possibility that a sense of discomfort is given to a user.

The present disclosure provides a hybrid vehicle capable of suppressing a rapid increase in an engine rotation speed in a case where motoring control is executed due to a limit to chargeable electric power during cruise traveling.

An aspect of the present disclosure relates to a hybrid vehicle including an engine, a first rotating electric machine, a second rotating electric machine coupled to drive wheels of the hybrid vehicle, a planetary gear mechanism, an electric power storage device, and an electronic control unit. The planetary gear mechanism is configured to mechanically couple the engine, the first rotating electric machine, and the second rotating electric machine. The electric power storage device is configured to perform charging and discharging with the first rotating electric machine and the second rotating electric machine. The electronic control unit is configured to, in a case where cruise control is requested or in a case where deceleration torque is requested by the cruise control, execute motoring control and simulated stepped gear shift control. The cruise control is control for maintaining a vehicle speed at a target value. The electronic control unit is configured to, as the motoring control, in a case where chargeable electric power to the electric power storage device is limited to be less than a threshold, increase a rotation speed of the engine with the first rotating electric machine such that engine brake torque is applied to the drive wheels. The electronic control unit is configured to, as the simulated stepped gear shift control, adjust an output of the first rotating electric machine such that a gear ratio that is a reduction ratio of the rotation speed of the engine with the planetary gear mechanism becomes one of a plurality of prescribed values to increase the rotation speed of the engine before the execution of the motoring control.

According to the aspect of the present disclosure, in a case where the deceleration torque is requested by the cruise control, first, the simulated stepped gear shift control is executed, and thereafter, when the chargeable electric power to the electric power storage device is limited to be less than the threshold, the motoring control is executed. That is, the simulated stepped gear shift control is executed before the execution of the motoring control. Though a detailed mechanism will be described below, a gear ratio is changed by the simulated stepped gear shift control, whereby it is possible to increase the rotation speed of the engine in advance before the execution of the motoring control. With this, an increase amount in the rotation speed of the engine accompanied with the execution of the motoring control decreases compared to a case where the simulated stepped gear shift control is not executed. That is, it is possible to suppress a rapid increase in the engine rotation speed.

In the hybrid vehicle according to the aspect of the present disclosure, the electronic control unit may be configured to, as the simulated stepped gear shift control, adjust the output of the first rotating electric machine such that the engine brake torque is a value smaller than the deceleration torque and the gear ratio becomes the largest value among the prescribed values.

The regenerative electric power of the second rotating electric machine is determined according to the difference between the engine brake torque and the deceleration torque. The greater the gear ratio, the greater the engine brake torque. According to the aspect of the present disclosure, since the output of the first rotating electric machine is adjusted such that the engine brake torque is a value smaller than the deceleration torque and the gear ratio becomes the largest value among the values, it is possible to generate the engine brake torque having a magnitude closest to the deceleration torque and to minimize the magnitude of the regenerative electric power. Therefore, it is possible to more reliably limit charging electric power to the electric power storage device to be less than the chargeable electric power.

In the hybrid vehicle according to the aspect of the present disclosure, the electronic control unit may be configured to, as the simulated stepped gear shift control, in a case where a state in which the engine brake torque is smaller than the deceleration torque is continued for a predetermined period, adjust the output of the first rotating electric machine such that the gear ratio increases to a one-step larger value among the prescribed values.

In a case where the simulated stepped gear shift control is executed even though the deceleration torque is not temporally stable (for example, repeatedly increases and decreases) during the execution of the cruise control, the gear ratio is changed needlessly, whereby there is a possibility that vibration, noise, or the like occurs in the hybrid vehicle and comfortableness of the user is deteriorated. According to the aspect of the present disclosure, until a state in which the engine brake torque is less than the deceleration torque is continued for a predetermined period, change of the gear ratio by the simulated stepped gear shift control is suppressed. Therefore, it is possible to further reduce vibration, noise, or the like of the hybrid vehicle.

In the hybrid vehicle according to the aspect of the present disclosure, the electronic control unit may be configured to adjust regenerative torque of the second rotating electric machine to compensate torque that is insufficient in the engine brake torque with respect to the deceleration torque.

In a case where the engine brake torque is greater than the deceleration torque, the hybrid vehicle is decelerated excessively, and cruise traveling cannot be continued. According to the aspect of the present disclosure, the engine brake torque is smaller than the deceleration torque, and the above-described insufficient torque is compensated by the regenerative torque of the second rotating electric machine. With this, it is possible to improve energy efficiency by charging the electric power storage device with the regenerative electric power corresponding to the regenerative torque while continuing cruise traveling by suppressing excessive deceleration of the hybrid vehicle.

According to the aspect of the present disclosure, in a hybrid vehicle that is cruise traveling, it is possible to suppress a rapid increase in engine rotation speed in a case where motoring control is executed due to a limit to chargeable electric power.

BRIEF DESCRIPTION OF THE DRAWINGS

Features, advantages, and technical and industrial significance of exemplary embodiments of the present disclosure will be described below with reference to the accompanying drawings, in which like numerals denote like elements, and wherein.

DETAILED DESCRIPTION OF EMBODIMENTS

Hereinafter, an embodiment of the present disclosure will be described in detail referring to the drawings. The same or similar portions are represented by the same reference numerals, and description thereof will not be repeated.

EMBODIMENT

Overall Configuration of Hybrid Vehicle

Figure 1:
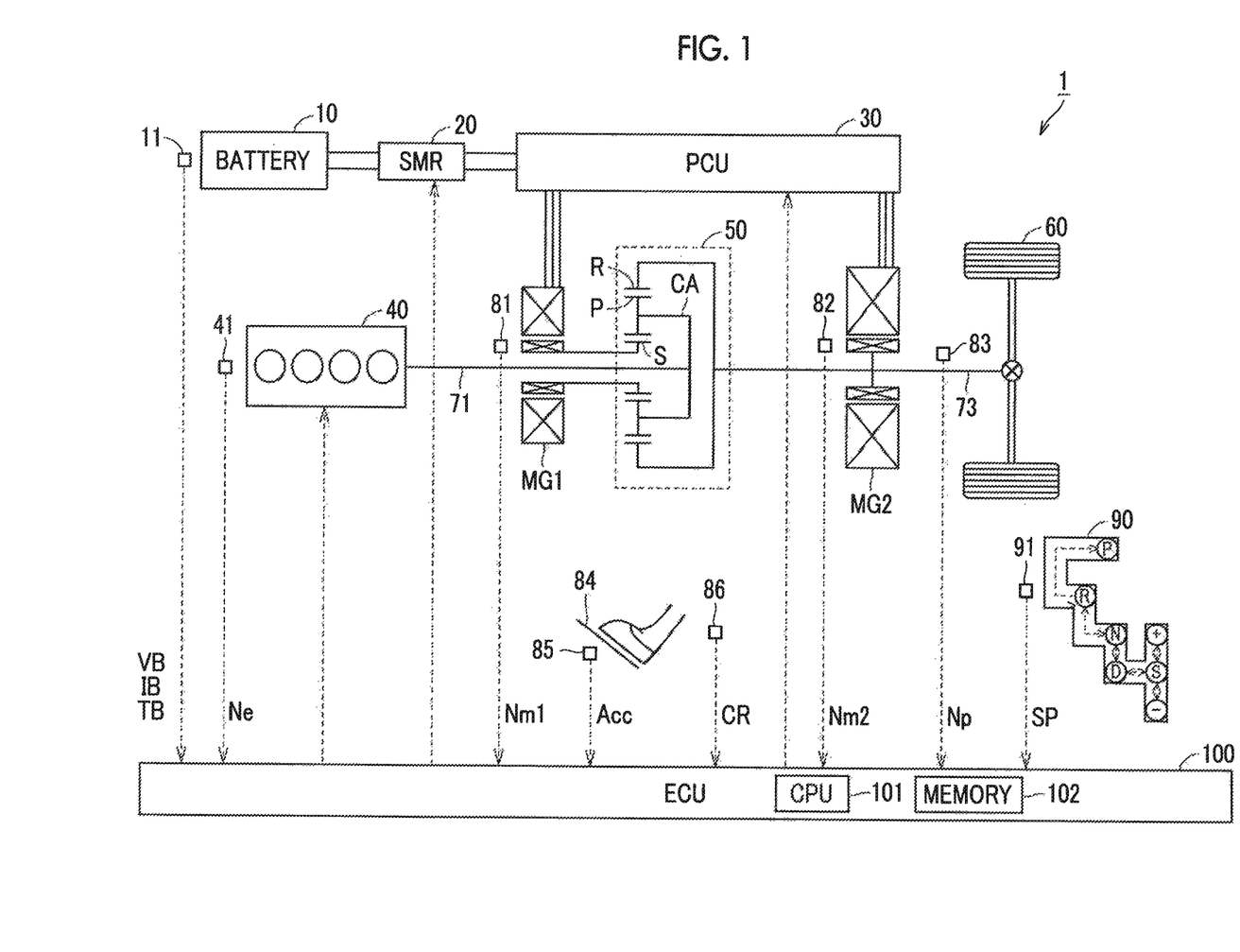
FIG. 1 is a diagram schematically showing the overall configuration of a hybrid vehicle according to an embodiment.

FIG. 1 is a diagram schematically showing the overall configuration of a hybrid vehicle according to the embodiment. Referring to FIG. 1, a vehicle 1 includes a battery 10, a system main relay (SMR) 20, a power control unit (PCU) 30, an engine 40, a motor generator (MG) MG1, a planetary gear mechanism 50, a motor generator MG2, and an electronic control unit (ECU) 100.

The battery 10 is a rechargeable electric power storage device. The battery 10 includes a secondary battery represented by a nickel-hydrogen battery or a lithium-ion battery. Instead of the battery 10, a capacitor, such as an electric double layer capacitor, may be used. Hereinafter, a charging direction to the battery 10 will be described as a positive direction of a current (electric power).

The battery 10 is provided with a battery sensor 11. The battery sensor 11 includes a voltage sensor, a current sensor, and a temperature sensor (all of these are not shown). The voltage sensor detects a voltage VB of the battery 10. The current sensor detects a current IB that is input and output to and from the battery 10. The temperature sensor detects a temperature TB of the battery 10. The sensors output detection results to the ECU 100. The ECU 100 calculates a state of charge (SOC) of the battery 10 based on signals from the sensors.

The SMR 20 is electrically connected between the battery 10 and the PCU 30. The SMR 20 switches conduction and shutoff between the battery 10 and the PCU 30 based on a control signal from the ECU 100.

The PCU 30 includes a converter and an inverter (both are not shown). The PCU 30 boosts direct-current electric power stored in the battery 10, converts the boosted voltage to an alternating-current voltage, and supplies the alternating-current voltage to the motor generator MG1 and the motor generator MG2. The PCU 30 converts alternating-current electric power generated by the motor generator MG1 and the motor generator MG2 to direct-current electric power and supplies the direct-current electric power to the battery 10.

The engine 40 is an internal combustion engine, such as a gasoline engine or a diesel engine. The engine 40 generates power for traveling of the vehicle 1 based on a control signal from the ECU 100. The power generated by the engine 40 is output to the planetary gear mechanism 50.

The engine 40 is provided with an engine rotation speed sensor 41. The engine rotation speed sensor 41 detects a rotation speed (engine rotation speed) Ne of the engine 40 and outputs a detection result to the ECU 100.

The planetary gear mechanism 50 mechanically couples a crankshaft 71 of the engine 40, a rotating shaft of the motor generator MG1, and a rotating shaft of the motor generator MG2. Specifically, the planetary gear mechanism 50 includes a sun gear S, a ring gear R, a carrier CA, and a pinion gear P. The pinion gear P meshes with the sun gear S and the ring gear R. The carrier CA supports the pinion gear P rotatably and is coupled to the crankshaft 71 of the engine 40. The sun gear S is coupled to the rotating shaft of the motor generator MG1. The ring gear R is coupled to the rotating shaft of the motor generator MG2 and drive wheels 60.

The planetary gear mechanism 50 has a configuration described above, whereby a rotation speed (a rotation speed of the sun gear S) of the motor generator MG1, the rotation speed (a rotation speed of the carrier CA) of the engine 40, and a rotation speed (a rotation speed of the ring gear R=a rotation speed of a propeller shaft 73) of the motor generator MG2 have a relationship (that is, a relationship in, a case where two rotation speeds are determined, the remaining rotation speed is also determined) of being connected by a straight line on a collinear diagram. Hereinafter, the above-described relationship is referred to as "a relationship of a collinear diagram". The relationship of the collinear diagram will be described in more detail in FIGS. 3 and 5.

Each of the motor generator MG1 and the motor generator MG2 is an alternating-current rotating electric machine, and is, for example, a three-phase alternating-current permanent magnet type synchronous motor. In a case of starting the engine 40, the motor generator MG1 rotates the crankshaft 71 of the engine 40 using electric power of the battery 10. The motor generator MG1 may generate electric power using the power of the engine 40. Alternating-current electric power generated by the motor generator MG1 is converted to direct-current electric power by the PCU 30 and the direct-current electric power is charged in the battery 10. The alternating-current-electric power generated by the motor generator MG1 may be supplied to the motor generator MG2.

The motor generator MG2 rotates an output shaft of the planetary gear mechanism 50 using at least one of the electric power from the battery 10 and the electric power generated by the motor generator MG1. The motor generator MG2 performs regenerative electric power generation using kinetic energy of the vehicle 1 transmitted from the drive wheels 60 in a state in which a user does not depress an accelerator pedal. Alternating-current electric power generated by the motor generator MG2 is converted to direct-current electric power by the PCU 30 and the direct-current electric power is charged in the battery 10.

The motor generator MG1 is provided with a resolver 81. The resolver 81 detects a rotation speed (MG1 rotation speed) Nm1 of the motor generator MG1 and outputs a detection result to the ECU 100. Similarly, the motor generator MG2 is provided with a resolver 82. The resolver 82 detects a rotation speed (MG2 rotation speed) Nm2 of the motor generator MG2 and outputs a detection result to the ECU 100.

The propeller shaft 73 is provided with a vehicle speed sensor 83. The vehicle speed sensor 83 detects a rotation speed (propeller shaft rotation speed) Np of the propeller shaft 73 and outputs a detection result to the ECU 100. The ECU 100 calculates a vehicle speed V based on the propeller shaft rotation speed Np.

The vehicle 1 is further provided with, as a configuration for traveling control of the vehicle 1, an accelerator pedal 84, an accelerator position sensor 85, a cruise control switch 86, a shift gate 90, and a shift sensor 91.

The accelerator position sensor 85 detects an accelerator operation amount Acc corresponding to a depression amount of the accelerator pedal 84 by the user and outputs a detection result to the ECU 100.

The cruise control switch 86 outputs, to the ECU 100, a cruise command CR indicating that cruise control is requested in a case of being operated to be turned on by the user. The cruise control is control for maintaining the vehicle speed V at a target vehicle speed (target value) Vtag regardless of the accelerator operation amount Acc. Specifically, in a case where a vehicle (not shown) having a followable vehicle speed is in front of the vehicle 1, the vehicle speed of the forward vehicle can be set to the target vehicle speed Vtag. An inter-vehicle distance from the forward vehicle can be measured using a camera, a radar, or the like (not shown). Alternatively, a vehicle speed set by the user may be set to the target vehicle speed Vtag.

A position (shift position SP) of a shift lever is displaced along the shift gate 90 according to a shift lever operation by the user. In the shift gate, for example, a parking (P) position, a reverse (R) position, a neutral (N) position, a drive (D) position, and a sequential shift (S) position are formed. Furthermore, in the shift gate, a plus (+) position and a minus (−) position are provided with the S position as a neutral position. The shift sensor 91 detects the shift position SP and outputs a detection result to the ECU 100.

The ECU 100 includes a central processing unit (CPU) 101, a memory 102, and a buffer (not shown). The ECU 100 controls machinery based on the signals received from the sensors and a map and a program stored in the memory 102 such that the vehicle 1 is brought into a desired traveling state. A part or the whole of the ECU 100 may be configured to execute calculation processing with hardware, such as an electronic circuit.

Specifically, the ECU 100 calculates requested torque for maintaining the vehicle speed V at the target vehicle speed Vtag based on the difference between the target vehicle speed Vtag and a current vehicle speed V during the execution of the cruise control.

Hereinafter, negative requested torque is referred to as "deceleration torque" Tr*. Power corresponding to the requested torque is referred to as "requested power", and power (power that is positive in a deceleration direction) corresponding to the deceleration torque Tr* is referred to as "deceleration power" Pr*.

The ECU 100 sets upper limit electric power (hereinafter, simply referred to as "chargeable electric power") Win chargeable into the battery 10 based on the voltage VB, the current IB, and the temperature TB of the battery 10 detected by the battery sensor 11. For example, the ECU 100 limits the chargeable electric power Win to a value smaller than a predetermined value according to the temperature TB of the battery 10. The ECU 100 limits the chargeable electric power Win to a smaller value when the SOC of the battery 10 is greater. Then, the ECU 100 controls the electric power generated by the motor generators MG1, MG2 such that charging electric power to the battery 10 does not exceed the chargeable electric power Win.

Figure 3A:
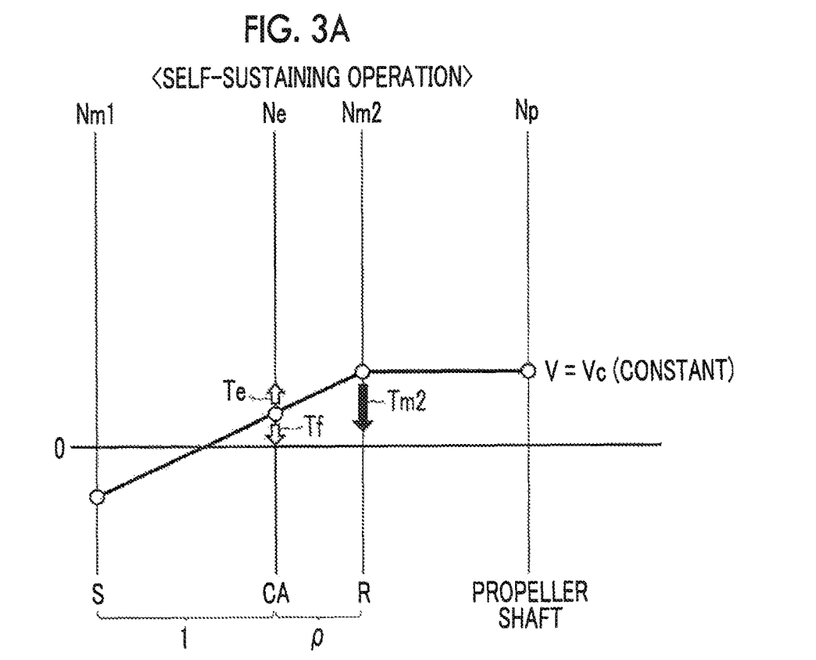
FIG. 3A is a collinear diagram illustrating a traveling state of the hybrid vehicle in a case where motoring of an engine is performed during cruise traveling.
Figure 3B:
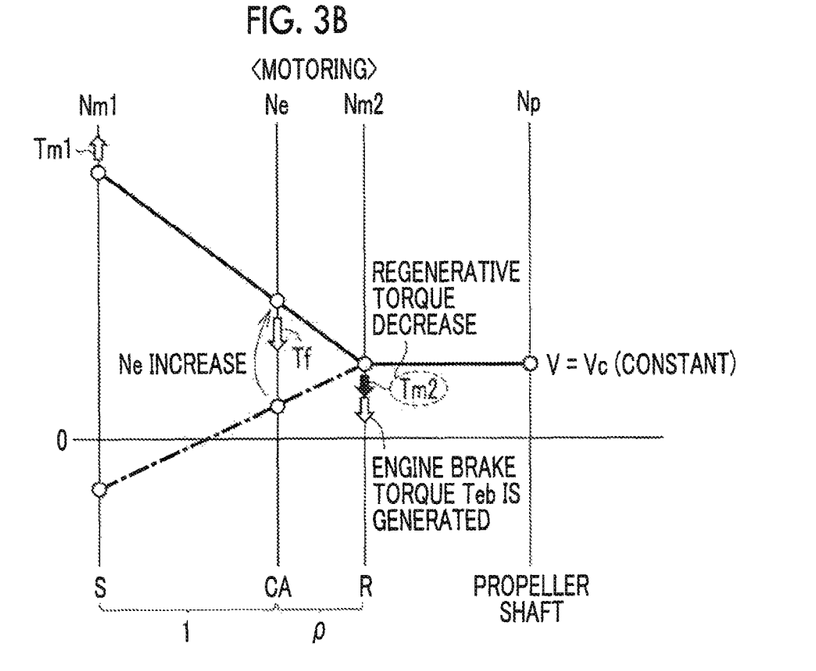
FIG. 3B is a collinear diagram illustrating a traveling state of the hybrid vehicle in a case where motoring of the engine is performed during cruise traveling.

The ECU 100 is configured to control the engine 40 and the PCU 30 (motor generators MG1, MG2) such that the planetary gear mechanism 50 functions as an electric transmission (continuously variable transmission). In more detail, the ECU 100 appropriately adjusts the MG1 rotation speed Nm1 (=the rotation speed of the sun gear S) based on the relationship of the collinear diagram (see FIG. 3 or 5), thereby continuously switching a "gear ratio" that is a ratio of the engine rotation speed Ne (=the rotation speed of the carrier CA) to the propeller shaft rotation speed Np (=the rotation speed of the ring gear R). The gear ratio can be also referred to as a reduction ratio of the engine rotation speed Ne by the planetary gear mechanism 50.

In a case where the shift lever is operated to the D position, the vehicle 1 is set to an automatic shift mode. In the automatic shift mode, the ECU 100 sets the gear ratio continuously regardless of a shift lever operation by the user.

In a case where the shift lever is operated to the S position, the vehicle 1 is set to a sequential shift mode. The sequential shift mode is a mode in which the gear ratio is set to one of a plurality of prescribed values according to a shift lever operation by the user. In the sequential shift mode, the ECU 100 controls the planetary gear mechanism 50 like a stepped transmission simulatively using the relationship of the collinear diagram.

In the embodiment, a case where the number of gear shift stages is 10, and the gear shift stage is set to one of a first gear stage (lowest gear stage) to a tenth gear stage (highest gear stage) will be described as an example. The gear ratio of the first gear stage is the greatest, and the gear ratio of the tenth gear stage is the smallest. Control (control for relatively decreasing the gear ratio) for changing the gear shift stage to a high gear side is referred to as "up-shift", and control (control for relatively increasing the gear ratio) for changing the gear shift stage to a low gear side is referred to as a "down-shift".

Motoring During Cruise Traveling

Hereinafter, in the vehicle 1 that is traveling (cruise traveling) while executing the cruise control, a situation is assumed in which a traveling state in which the vehicle speed V is likely to increase is continued. As the situation described above, for example, a situation in which the vehicle 1 is traveling on a relatively long downhill is exemplified.

Figure 2:
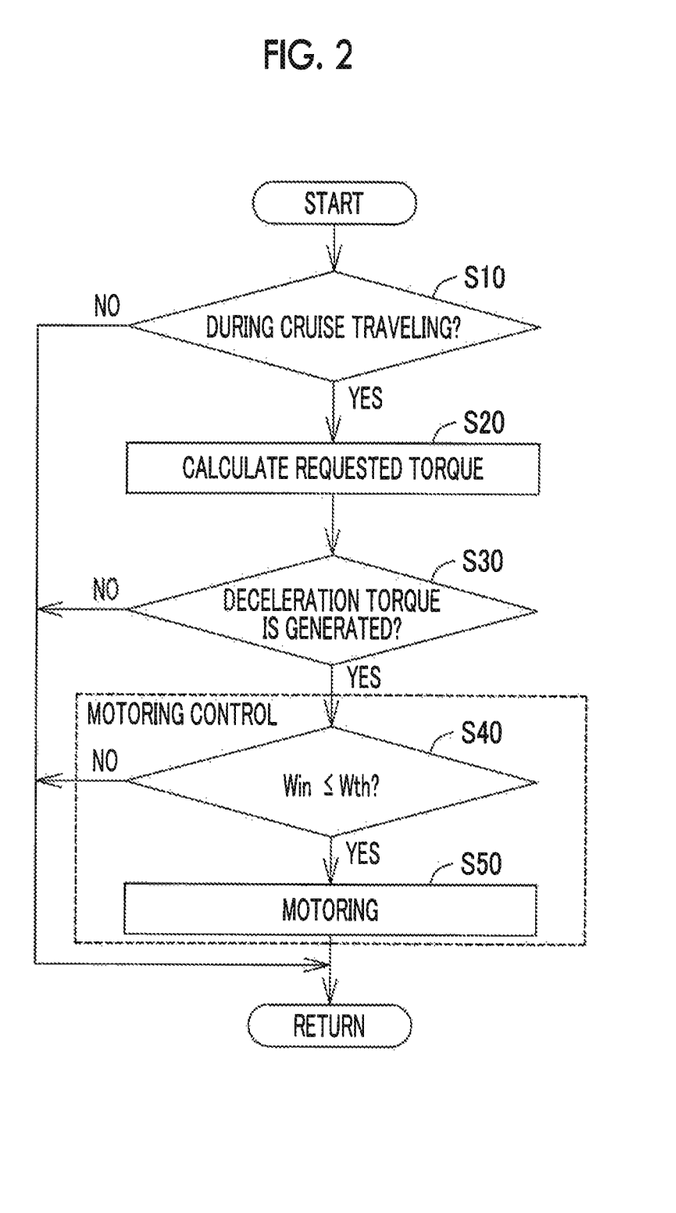
FIG. 2 is a flowchart illustrating control during cruise traveling in the embodiment.

FIG. 2 is a flowchart illustrating control during cruise traveling in the embodiment. The flowchart shown in FIG. 2 and a flowchart shown in FIG. 8 described below are called from a main routine and executed each time a predetermined condition is arranged or each time a predetermined calculation cycle elapses. Each step (hereinafter, indicated by "S") of the flowcharts are basically realized through software processing by the ECU 100, but may be realized by hardware (electronic circuit) prepared in the ECU 100.

Referring to FIGS. 1 and 2, in S10, the ECU 100 determines whether or not the vehicle 1 is cruise traveling. Determination can be made whether or not the vehicle 1 is cruise traveling based on the cruise command CR from the cruise control switch 86.

In a case where the vehicle 1 is cruise traveling (in S10, YES), the ECU 100 calculates the requested torque of the vehicle 1 (S20), and determines whether or not the requested torque is negative (S30). A calculation method of the requested torque has been described referring to FIG. 1, and thus, description thereof will not be repeated.

In a case where the vehicle 1 is not cruise traveling (in S10, NO), or in a case where the requested torque is positive or zero (in S30, NO), the ECU 100 skips subsequent processing and returns the process to the main routine. In a case where the requested torque is negative, that is, in a case where the deceleration torque Tr* is generated (in S30, YES), the ECU 100 progresses the process to S40.

In order to maintain the vehicle speed V constant during traveling on a relatively long downhill, there is demand for continuously generating sufficient braking torque as the whole of the vehicle 1. As a method of realizing this, regenerative torque can be continuously generated by the motor generator MG2. However, in this case, since regenerative electric power (power corresponding to the regenerative torque) of the motor generator MG2 is continuously charged in the battery 10, the SOC of the battery 10 may approach a full charge state. As a result, there is a possibility that the chargeable electric power Win is limited to a value smaller than a threshold Wth.

In S40, the ECU 100 determines whether or not the chargeable electric power Win is equal to or less than the threshold Wth. In a case where the chargeable electric power Win is equal to or less than the threshold Wth (in S40, YES), the ECU 100 progresses the process to S50, and performs motoring of the engine 40 by the motor generator MG1.

FIGS. 3A and 3B are collinear diagrams illustrating a traveling state of the vehicle 1 in a case where motoring of the engine 40 is performed during cruise traveling (in a case where processing of S50 of FIG. 2 is performed). Since the cruise control is under execution, the vehicle speed V is maintained at a constant speed Vc.

Before the start of motoring, as shown in FIG. 3A, the engine 40 is under a self-sustaining operation, engine torque Te in a positive direction and friction torque Tf in a negative direction balance each other. Regenerative torque Tm2 is output from the motor generator MG2, and regenerative electric power is charged in the battery 10. The engine 40 may be stopped.

In a case where the chargeable electric power Win becomes equal to or less than the threshold Wth, motoring is performed. When motoring is performed, as shown in FIG. 3B, torque Tm1 in a positive direction is output from the motor generator MG1, whereby the engine rotation speed Ne increases. Along with this, the friction torque Tf is defined as reaction force, whereby the torque Tm1 from the motor generator MG1 is applied as braking torque (so-called engine brake) to the ring gear R (in other words, the drive wheels 60). Accordingly, the above-described torque is hereinafter referred to as "engine brake torque" Teb.

Expression (1) described below is established among the requested torque (deceleration torque Tr*) for maintaining the vehicle speed V at the constant speed Vc, the regenerative torque Tm2, and the engine brake torque Teb.

$$Tr^* = Tm2 + Teb \quad (1)$$

According to Expression (1), since it is possible to decrease the regenerative torque Tm2 by an amount of increase of the engine brake torque Teb due to motoring while the securing the deceleration torque Tr* as the whole of the vehicle 1, it is possible to further reduce the charging electric power to the battery 10. In addition, during motoring, the motor generator MG1 rotates forward and outputs the torque Tm1 that is positive torque. For this reason, electric power is consumed by the motor generator MG1, whereby the charging electric power to the battery 10 is also reduced. Accordingly, even in a case where the chargeable electric power Win is limited to be equal to or less than the threshold Wth with an increase in the SOC of the battery 10, or the like, it is possible to maintain the charging electric power to the battery 10 at a value equal to or less than the chargeable electric power Win after the limit.

Time Chart of Cruise Traveling in Comparative Example

Hereinafter, in order to clarify the feature of cruise traveling in the embodiment, a comparative example where "down-shift control" described below is not executed will be first described. The configuration of a vehicle according to the comparative example is basically the same as the configuration of the vehicle 1 according to the embodiment, and thus, description thereof will not be repeated.

Hereinafter, power corresponding to the engine brake torque Teb (see FIG. 4) generated with an increase in the friction torque Tf is referred to as "friction power Pf". Electric power that is charged in the battery 10 as the regenerative electric power of the motor generator MG2 and electric power that is consumed by the motor generator MG1 for motoring control are comprehensively referred to as "battery power Pb".

Figure 4:
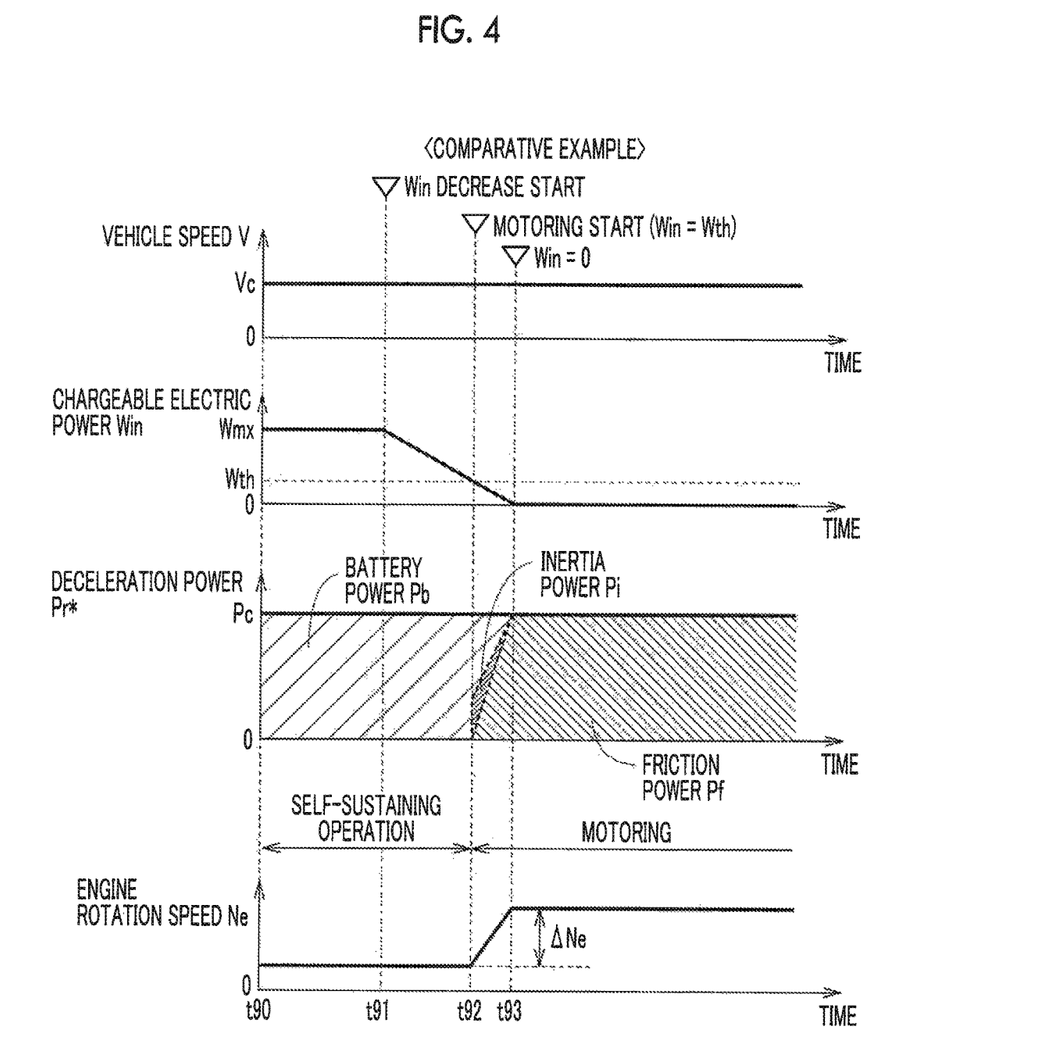
FIG. 4 is a time chart illustrating control during cruise traveling in a comparative example.

FIG. 4 is a time chart illustrating control during cruise traveling in the comparative example. In FIG. 4, the horizontal axis indicates an elapsed time. The vertical axis indicates the vehicle speed V, the chargeable electric power Win, the deceleration power Pr*, and the engine rotation speed Ne in order from above.

In the example of FIG. 4 and an example of FIG. 7 described below, the vehicle speed V is constant at Vc. The D position is selected as the shift position SP, and the vehicle 1 is in the automatic shift mode. The deceleration power Pr* can change with time; however, here, for ease of understanding, a case where the deceleration power Pr* is constant at a Pc value will be described as an example.

Referring to FIGS. 1 and 4, at time t90, the chargeable electric power Win is not limited yet and is a maximum value Wmx. For this reason, the entire regenerative electric power of the motor generator MG2 can be charged in the battery 10. At this time, the engine 40 is under a self-sustaining operation at a low rotation speed (for example, about 1,000 rpm) or stopped (FIG. 4 shows an example of the self-sustaining operation).

At time t91, for example, since the SOC of the battery 10 becomes greater than a predetermined range, the chargeable electric power Win starts to decrease. As a result, at time t92, the chargeable electric power Win reaches the threshold Wth. The threshold Wth is appropriately calculated from the deceleration power Pr*.

Hence, at time t92, motoring of the engine 40 by the motor generator MG1 is started. With this, the friction power Pf is generated along with inertia power Pi (power corresponding to a moment of inertia) for increasing the engine rotation speed Ne. A part of the deceleration power Pr* is consumed as the inertia power Pi and the friction power Pf, whereby it is possible to compensate an amount of decrease of the chargeable electric power Win.

Thereafter, in a case where the chargeable electric power Win further decreases, there is demand for increasing the friction power Pf by the amount of decrease. Hence, the ECU 100 increases the torque Tm1 of the motor generator MG1, and accordingly, further increases the friction power Pf. The inertia power Pi decreases with the lapse of time.

After time t93, the chargeable electric power Win reaches zero, the charging electric power to the battery 10 becomes zero. That is, the Pc value of the deceleration power Pr* is satisfied with the friction power Pf, and the regenerative electric power becomes zero.

As shown in FIG. 4, in a period of time t92 and time t93 of control, the chargeable electric power Win should be quickly decreased according to the situation of the battery 10. In a case of performing motoring while quickly decreasing the chargeable electric power Win, there is demand for rapidly increasing the engine rotation speed Ne, and accordingly, rapidly increasing the engine brake torque Teb. However, when this happens, the rotation speed of the engine increases even during traveling on a relatively long downhill, and there is a possibility that a sense of discomfort is given to the user (the amount of increase of the engine rotation speed is indicated by ΔNe).

Accordingly, in the embodiment, a configuration in which down-shift control is executed before the motoring control is executed (motoring with a limit to the chargeable electric power Win is started) is employed. As described below in detail, the engine rotation speed Ne is increased in advance through the down-shift control before the execution of the motoring control, whereby it is possible to suppress a rapid increase in the engine rotation speed Ne.

Figure 5:
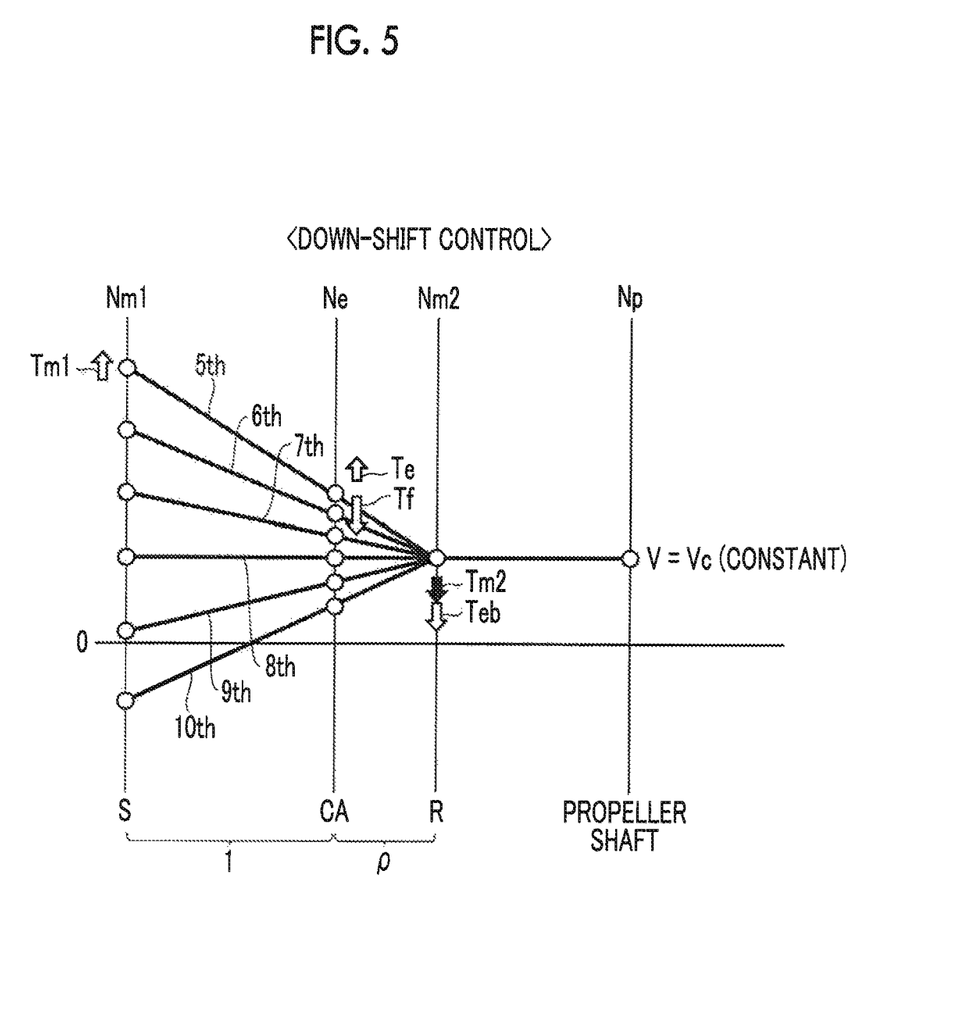
FIG. 5 is a collinear diagram illustrating a traveling state of a vehicle in a case where a down-shift is performed during cruise traveling.

FIG. 5 is a collinear diagram illustrating a traveling state of the vehicle 1 in a case where a down-shift is performed during cruise traveling. The vehicle 1 is set to the automatic shift mode. For this reason, normally, the ECU 100 makes the planetary gear mechanism 50 function as a continuously variable transmission that is switchable a gear ratio continuously. However, in the embodiment, in a case where the cruise control is executed and the deceleration torque Tr* is generated, the ECU 100 controls the planetary gear mechanism 50 like a stepped transmission simulatively to set a gear shift stage.

The gear shift stage is basically determined according to the vehicle speed V; however, in the embodiment, a case where the current gear shift stage is the tenth gear stage and a down-shift is performed from the tenth gear stage to the fifth gear stage in a stepwise manner will be described illustratively. In FIG. 5, straight lines corresponding to the tenth gear stage to the fifth gear stage are indicated by 10th to 5th.

In each gear shift stage, as described in Expression (1) described above, the ECU 100 makes the torque Tm1 output from the motor generator MG1 such that the regenerative torque Tm2 and the engine brake torque Teb according to the deceleration torque (negative requested torque) Tr* are applied to the drive wheels 60. At this time, each time the gear shift stage decreases from the tenth gear stage to the fifth gear stage by one stage (each time the gear ratio increases by one step), the engine rotation speed Ne increases.

In this way, the down-shift control is control for increasing the engine rotation speed Ne by adjusting the torque Tm1 of the motor generator MG1 such that the gear ratio becomes one of a plurality of prescribed values. The down-shift control corresponds to "simulated stepped gear shift control" according to the aspect of the present disclosure.

Determination Method of Gear Shift Stage

Although a case where the down-shift is performed from the tenth gear stage to the fifth gear stage has been described, a determination method of a target gear shift stage (in the example, the fifth gear stage) will be hereinafter described.

Figure 6:
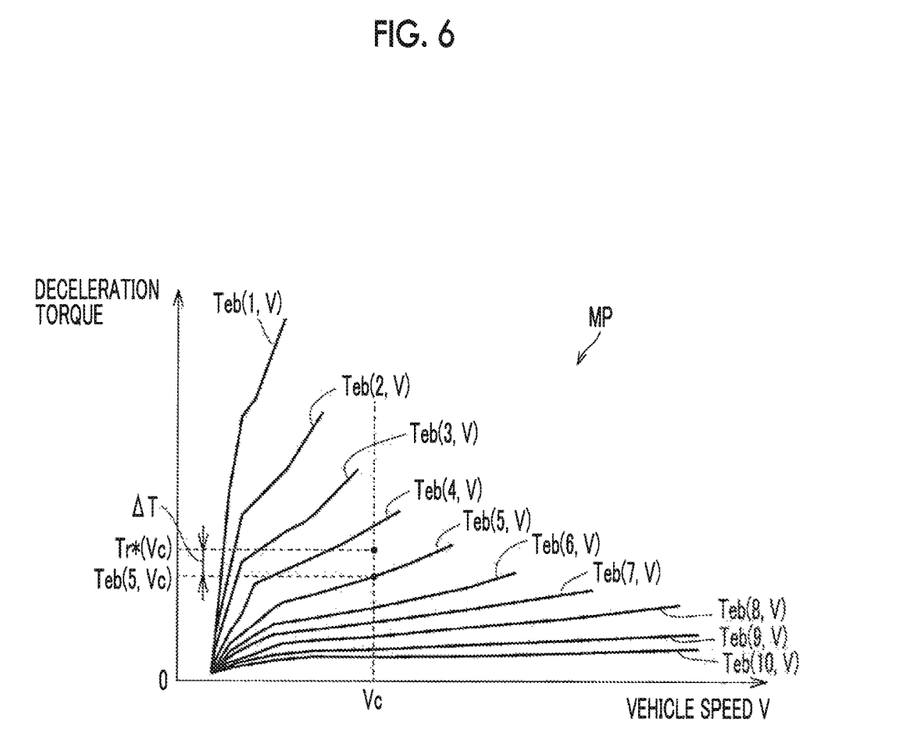
FIG. 6 is a diagram illustrating a determination method of a target gear shift stage in the embodiment.

FIG. 6 is a diagram illustrating a determination method of a target gear shift stage in the embodiment. In FIG. 6, the horizontal axis indicates the vehicle speed V, and the vertical axis indicates the deceleration torque (torque in a braking direction) Tr*. FIG. 6 shows the relationship between the engine brake torque Teb and the vehicle speed V in each gear shift stage in a case where the planetary gear mechanism 50 is controlled like a stepped transmission. Such a relationship is obtained in advance by an experiment, and is stored in the memory 102 of the ECU 100 as a map MP.

In an example shown in FIG. 6, in a case where the vehicle speed V is maintained at the constant speed Vc through the cruise control, when a fourth gear stage is selected as a gear shift stage, the engine brake torque Teb becomes greater than the deceleration torque Tr*(|Teb(4,Vc)|>|Tr*(Vc)|). In this case, there is a possibility that the vehicle speed V decreases excessively. Accordingly, a gear shift stage in which the vehicle speed V can be maintained at Vc is one of the tenth gear stage to the fifth gear stage that is a gear shift stage (a gear shift stage in which a relationship |Teb(N,Vc)|≤|Tr*(Vc)| is established) in which the engine brake torque Teb becomes equal to or less than the deceleration torque Tr*.

In the embodiment, the engine brake torque Teb is equal to or less than the deceleration torque Tr*, and the lowest gear side gear shift stage (that is, the greatest gear ratio) is selected. Accordingly, in the example shown in FIG. 6, the fifth gear stage is selected as a target gear shift stage. Then, a down-shift is repeatedly performed until the gear shift stage reaches the fifth gear stage from the tenth gear stage. For example, during the execution of motoring control in which the fifth gear stage is formed, power corresponding to the difference ΔT between engine brake torque Teb(5,Vc) and deceleration torque Tr*(Vc), that is, power corresponding to torque exceeding the engine brake torque Teb(5,Vc) of the deceleration torque Tr*(Vc) is charged in the battery 10 or consumed through motoring by the motor generator MG1.

Time Chart of Cruise Traveling in Embodiment

Figure 7:
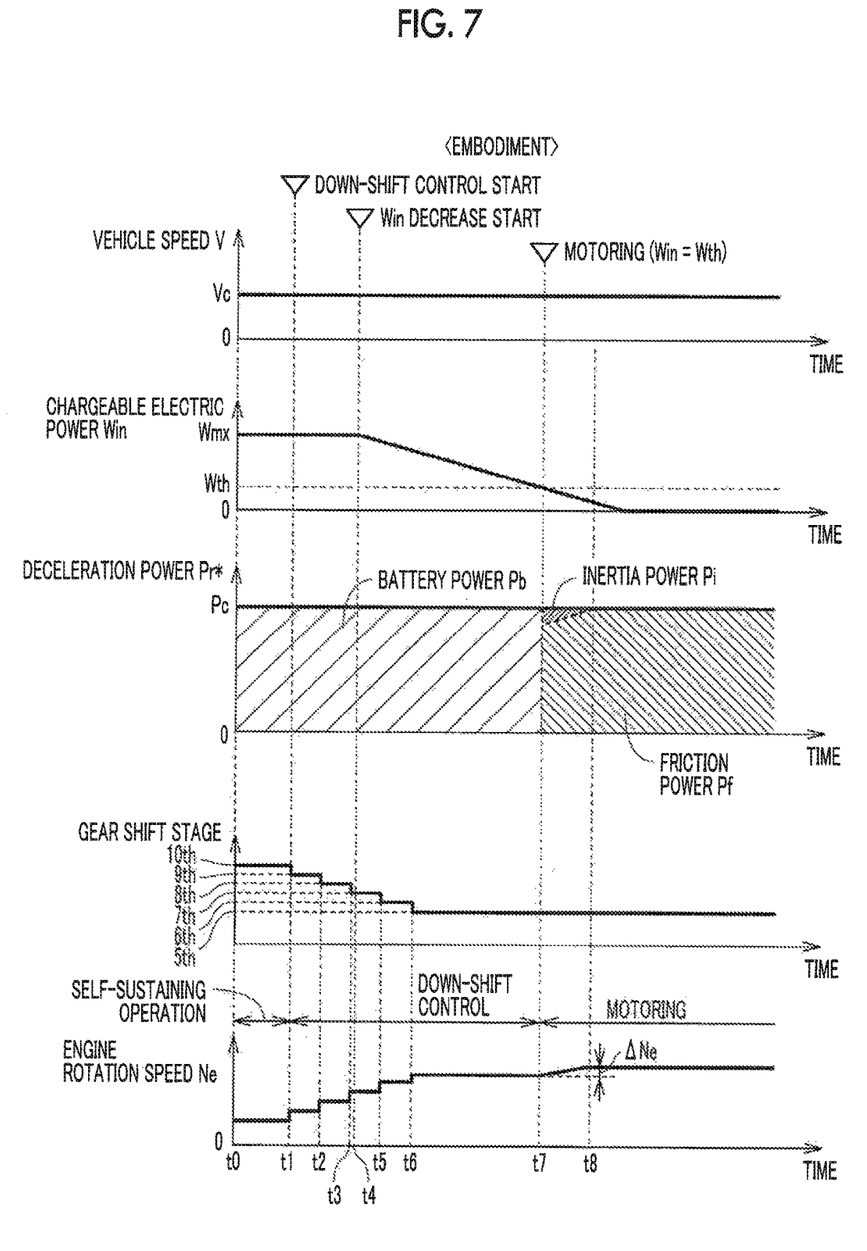
FIG. 7 is a time chart illustrating an example of control during cruise traveling in the embodiment.

FIG. 7 is a time chart illustrating an example of control during cruise traveling in the embodiment. In FIG. 7, the horizontal axis indicates an elapsed time. The vertical axis indicates the vehicle speed V, the chargeable electric power Win, the deceleration power Pr*, a simulative gear shift stage of the planetary gear mechanism 50, and the engine rotation speed Ne in order from above.

Referring to FIGS. 1 and 7, at time t0, similarly to the comparative example (see FIG. 4), the chargeable electric power Win is the maximum value Wmx. For this reason, the regenerative electric power corresponding to the Pc value of the deceleration power Pr* can be charged in the battery 10. At this time, the engine 40 is under a self-sustaining operation at a low rotation speed or stopped (FIG. 7 shows an example of the self-sustaining operation). The gear shift stage is set to the tenth gear stage.

In the embodiment, as described referring to FIGS. 5 and 6, in a case where the deceleration torque Tr* is generated during the cruise traveling in the automatic shift mode (in a case where the requested torque becomes negative), a down-shift is repeated, thereby increasing the engine rotation speed Ne in a stepwise manner.

In more detail, at time t1, a down-shift from the tenth gear stage to the ninth gear stage is performed. The engine rotation speed Ne increases accompanied with the above-described down-shift.

At time t2, a down-shift from the ninth gear stage to the eighth gear stage is performed. Similarly, at time t3, a down-shift from the eighth gear stage to the seventh gear stage is performed, at time t5, down-shift control from the seventh gear stage to the sixth gear stage is performed, and at time t6, a down-shift from the sixth gear stage to the fifth gear stage is performed. In the embodiment, as described referring to FIG. 6, in a case where the motoring control is executed after a down-shift to the fourth gear stage is performed, the friction power Pf exceeds the Pc value of the deceleration power Pr*. For this reason, change of the gear shift stage ends to the fifth gear stage, and the gear shift stage is maintained at the fifth gear stage.

At time t4, in order to suppress an increase in the SOC of the battery 10, a decrease in the chargeable electric power Win starts. The chargeable electric power Win is continued to decrease, and at time t7, reaches the threshold Wth. When this happens, the ECU 100 further increases the engine rotation speed Ne through motoring and increases the friction power Pf while maintaining the gear shift stage at the fifth gear stage. However, at time t7, the engine rotation speed Ne is high compared to a state before the execution of the down-shift control (a state before time t1). Hence, the amount ΔNe of increase of the engine rotation speed Ne is small in contrast to the comparative example (see FIG. 5).

In this way, according to the embodiment, before charging to the battery 10 is suppressed with a limit to the chargeable electric power Win, the down-shift control is executed, whereby the engine rotation speed Ne is increased in advance in a stepwise manner. With this, even in a case where the charging electric power to the battery 10 is suppressed by the chargeable electric power Win, it is possible to relatively decrease the amount ΔNe of increase of the engine rotation speed Ne by the motoring control. Accordingly, it is possible to suppress a sense of discomfort to the user due to an increase in the engine rotation speed Ne even during traveling on a relatively long downhill.

Down-Shift Control Flow

Figure 8:
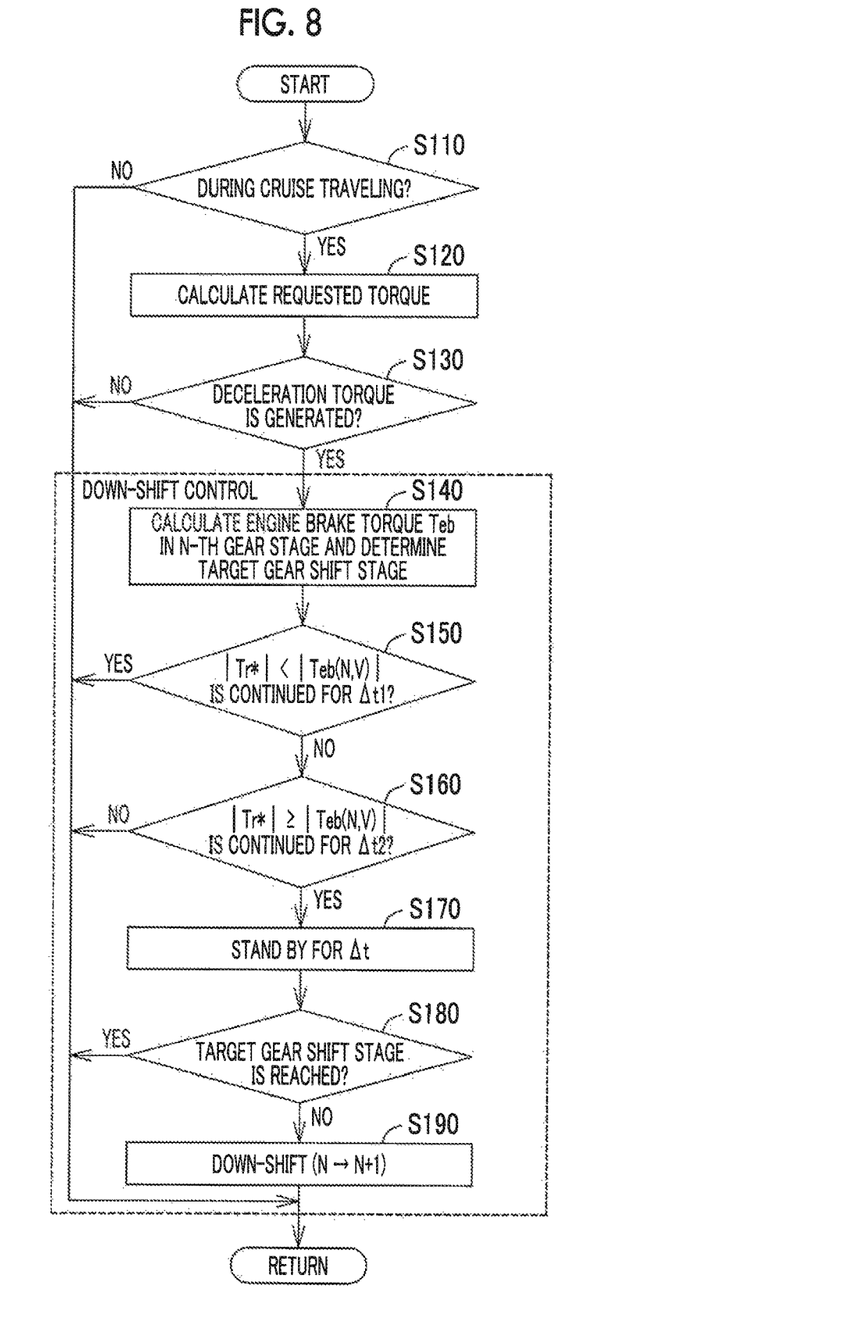
FIG. 8 is a flowchart illustrating down-shift control in the embodiment.

FIG. 8 is a flowchart illustrating the down-shift control in the embodiment. In FIG. 8, a current gear shift stage during traveling at the vehicle speed V is described as N (where N is an integer equal to or greater than 1 and equal to or less than 10). Referring to FIGS. 1 and 8, processing of S110 to S130 are the same as the processing of S10 to S30 shown in FIG. 4, and thus, detailed description thereof will not be repeated.

In a case where the vehicle 1 is cruise traveling and the deceleration torque Tr* is generated (in S110, YES and in S130, YES), the ECU 100 calculates engine brake torque Teb(N,V) in the N-th gear stage and determines a target gear shift stage from the current vehicle speed V and the deceleration torque Tr* with reference to the map MP shown in FIG. 6 (S140).

In S150, the ECU 100 determines whether or not a state in which the engine brake torque Teb(N,V) is greater than the deceleration torque Tr* is continued for a predetermined reference period Δt1 (for example, several 100 ms).

In a case where the state in which the engine brake torque Teb(N,V) is greater than the deceleration torque Tr* is continued for the reference period Δt1 (in S150, YES), excess torque of the engine brake torque Teb(N,V) for the deceleration torque Tr* is adjusted by the torque Tm2 of the motor generator MG2.

In contrast, in a case where the state in which the engine brake torque Teb(N,V) is greater than the deceleration torque Tr* is not continued tier the reference period Δt1 (in S150, NO), the ECU 100 progresses the process to S160.

In S160, the ECU 100 determines whether or not a state in which the engine brake torque Teb(N,V) is equal to or less than the deceleration torque Tr* is continued for a predetermined reference period Δt2. In a case where the state in which the engine brake torque Teb(N,V) is equal to or less than the deceleration torque Tr* is not continued for the reference period Δt2 (in S160, NO), the ECU 100 skips subsequent processing and returns the process to the main routine.

In a case where the state in which the engine brake torque Teb(N,V) is equal to or less than the deceleration torque Tr* is continued for the reference period Δt2 (in S160, YES), the ECU 100 stands by in the current gear shift stage (N-th gear stage) for a predetermined time Δt (for example, about two seconds) (S170), and then, determines whether or not the current gear shift stage reaches the target gear shift stage (S180).

In a case where the current gear shift stage does not reach the target gear shift stage (in S180, NO), the ECU 100 performs a down-shift of one stage (S190). In a case where the current gear shift stage reaches the target gear shift stage (in S180, YES), the ECU 100 returns the process to the main routine without performing a down-shift.

As described above, according to the embodiment, in a case where the deceleration torque (negative requested torque) Tr* is generated during cruise traveling, the down-shift control is executed before the execution of the motoring control. Through the above-described down-shift control, a simulative gear shift stage of the planetary gear mechanism 50 is changed to a low gear side by one stage, and accordingly, the engine rotation speed Ne increases (see FIG. 5 or 7). Accordingly, the amount ΔNe of increase of the engine rotation speed Ne by the motoring control becomes small compared to a case where the down-shift control is not executed before the execution of the motoring control. That is, it is possible to suppress a rapid increase in the engine rotation speed Ne. As a result, it is possible to suppress a sense of discomfort to the user due to racing of the engine rotation speed Ne even during traveling on a relatively long downhill.

In S160, in a case where the state in which the engine brake torque Teb(N,V) is equal to or less than the deceleration torque Tr* is not continued for the reference period Δt2 (in S160, NO), that is, in a case where a moment when the engine brake torque Teb(N) becomes greater than the deceleration torque Tr* occurs even once until the reference period Δt2 elapses, there is a possibility that the deceleration torque Tr* is not temporally stable or hunting of various signals for calculating the requested torque occurs. Nevertheless, in a case where a down-shift is performed, the gear ratio is changed needlessly, whereby vibration, noise, or the like occurs in the vehicle 1 and comfortableness of the user is deteriorated. According to the embodiment, a down-shift is suppressed until the state in which the engine brake torque Teb is equal to or less than the deceleration torque Tr* is continued for the reference period Δt2. With this, it is possible to further reduce vibration, noise, or the like of the vehicle 1. The same applies to the processing of S150. The reference period Δt1 in S150 and the reference period Δt2 in S160 may be identical or different from each other.

In the embodiment, although a configuration in which a down-shift is performed by one stage has been described as an example, for example, a down-shift may be performed by two stages. However, in a case where the number of stages that are changed with a single down-shift is too large (for example, three or more stages), the engine rotation speed Ne rapidly increases accompanied with the down-shift. A down-shift is limited to be performed by one stage, whereby it is possible to gradually increase the engine rotation speed Ne.

The embodiment disclosed herein is to be considered merely illustrative and not restrictive in all respects. The scope of the present disclosure is defined by the terms of the claims, rather than the above description of the embodiment, and is intended to include any modifications within the scope and meaning equivalent to the terms of the claims.

What is claimed is:

1. A hybrid vehicle comprising:
an engine;
a first rotating electric machine;
a second rotating electric machine coupled to drive wheels of the hybrid vehicle;
a planetary gear mechanism configured to mechanically couple the engine, the first rotating electric machine, and the second rotating electric machine;
an electric power storage device configured to perform charging and discharging with the first rotating electric machine and the second rotating electric machine; and
an electronic control unit configured to, in a case where cruise control is requested or in a case where deceleration torque is requested by the cruise control, execute a motoring control and a simulated stepped gear shift control, wherein:
the cruise control is control for maintaining a vehicle speed at a target value;
the electronic control unit is configured to, as the motoring control, in a case where chargeable electric power to the electric power storage device is limited to be less than a threshold, increase a rotation speed of the engine with the first rotating electric machine such that engine brake torque is applied to the drive wheels; and
the electronic control unit is configured to, as the simulated stepped gear shift control, adjust an output of the first rotating electric machine such that a gear ratio that is a reduction ratio of the rotation speed of the engine with the planetary gear mechanism becomes one of a plurality of prescribed values to increase the rotation speed of the engine before the execution of the motoring control.

2. The hybrid vehicle according to claim 1, wherein the electronic control unit is configured to, as the simulated stepped gear shift control, adjust the output of the first rotating electric machine such that the engine brake torque is a value smaller than the deceleration torque and the gear ratio becomes a largest value among the prescribed values.

3. The hybrid vehicle according to claim 1, wherein the electronic control unit is configured to, as the simulated stepped gear shift control, in a case where a state in which the engine brake torque is smaller than the deceleration torque is continued for a predetermined period, adjust the output of the first rotating electric machine such that the gear ratio increases to a one-step larger value among the prescribed values.

4. The hybrid vehicle according to claim 1, wherein the electronic control unit is configured to adjust regenerative torque of the second rotating electric machine to compensate torque that is insufficient in the engine brake torque with respect to the deceleration torque.

* * * * *